United States Patent [19]
Bentley et al.

[11] Patent Number: 5,914,951
[45] Date of Patent: Jun. 22, 1999

[54] SYSTEM AND METHOD FOR CONTROLLING AND MONITORING COMMUNICATION BETWEEN CUSTOMERS AND CUSTOMER SERVICE REPRESENTATIVES

[75] Inventors: Jon Louis Bentley, New Providence; Mark Jeffrey Foladare, Kendall Park; Shelley B. Goldman, East Brunswick; Norman Loren Schryer, New Providence; David Phillip Silverman, Somerville; Roy Philip Weber, Bridgewater, all of N.J.

[73] Assignees: AT&T Corp, Middletown; Lucent Technologies Inc., Murray Hill, both of N.J.

[21] Appl. No.: 08/632,873

[22] Filed: Apr. 16, 1996

[51] Int. Cl.[6] ..................................................... H04J 3/14
[52] U.S. Cl. ........................................... 370/352; 379/265
[58] Field of Search ................................ 379/34, 35, 265, 379/266, 88, 85, 207, 309, 201, 202, 211, 203, 204, 212; 370/356, 355, 357, 259, 270, 271, 351, 352, 353, 354

[56] References Cited

U.S. PATENT DOCUMENTS

| | | | |
|---|---|---|---|
| 5,577,112 | 11/1996 | Cambray et al. | 379/265 |
| 5,594,791 | 1/1997 | Szlam et al. | 379/265 |
| 5,696,811 | 12/1997 | Maloney et al. | 379/265 |
| 5,724,418 | 3/1998 | Brady | 379/265 |
| 5,742,596 | 4/1998 | Baratz et al. | 370/356 |
| 5,742,675 | 4/1998 | Kilander et al. | 379/266 |

*Primary Examiner*—Huy D. Vu

[57] ABSTRACT

The system of the present invention allows a customer to access a company computer system via a data network and to request contact with a customer service representative. The company computer system automatically selects a customer service center and a customer service representative in accordance with a set of selection criteria, including customer preferences. A monitor, also connected to the company computer system via the data network, may choose to accept or to change the selections made by the company computer system. Once a customer service representative has been selected, the company computer system causes a telecommunication control device to connect the customer, the selected customer service representative, and the monitor via a voice network. If a monitor is not available, the company computer system causes the telecommunication control device to connect the customer and the selected customer service representative, and then records the communication therebetween for future review by a monitor. Optionally, the selected customer service representative may initiate data communication with the customer via the data network. The monitor may readily monitor the data communication between the customer and the customer service representative via the data network.

44 Claims, 4 Drawing Sheets

SYSTEM AND METHOD FOR CONTROLLING AND MONITORING COMMUNICATION BETWEEN CUSTOMERS AND CUSTOMER SERVICE REPRESENTATIVES

BACKGROUND OF THE INVENTION

1. Field of the Invention

The present invention relates to a system and method for controlling and monitoring of communication between customers and a company's customer service representatives. More particularly, the present invention relates to a system and method for controlling, via a data network, the distribution of customer requests for assistance to various customer service representatives, and for monitoring of the communication between customers and customer service representatives via a voice network.

2. Description of the Related Art

Traditionally, calls by customers to a company's customer service center are not handled by a special system, but are typical telephone calls to one or more customer service telephone numbers designated by the company. The calls are answered by customer service representatives trained to address customers' questions and problems. To improve customer satisfaction some of the calls are monitored so that the performance of the customer service representatives may be evaluated. The monitoring is commonly performed by individuals specially trained to serve as mentors for the customer service representatives.

An increasing number of companies have established a plurality of remote customer service centers respectively located in different physical locations. For example, a company may have customer service centers in each of several countries. Each of the customer service centers may be dedicated to a particular function, such as sales or technical support, or may be dedicated to a particular geographical area, such as North America. Each customer service center typically has a separate telephone number. This approach to handling customer calls is problematic in several ways. First, a customer may not know the particular telephone number for the customer service center he is trying to reach. More importantly, the customer may not even know which of the company's customer service centers is appropriate for his particular needs. As a result, a customer must often make several telephone calls to various customer service centers before finding one with a customer service representative capable of assisting him. The problem is exacerbated when the customer is calling from another country and speaks another language. As the customer service center telephone numbers are generally toll-free, the above approach can be quite expensive for the company. In addition, a particular customer service center may have a high volume of calls with long waiting times for assistance, while another customer service center has a low volume of calls, and thus many available customer service representatives.

Another disadvantage of the standard approach to responding to customer requests for communication with customer service representatives is the difficulty of monitoring the customer service representatives located at remote customer service centers. The current approach of having one or more monitors at each customer service center is inefficient and expensive. Remote monitoring using conventional telephone features is an improvement over the previous approach, but it is still impractical since there is no way for the monitor to make a decision about which call to monitor other than by random selection of a particular customer service representative. Furthermore, with a standard remote monitoring scheme a monitor has no control over incoming calls from customers, making it impossible for the monitor to re-direct calls to other customer service centers in case of an emergency, such as a particular customer center loosing its telephone connection.

SUMMARY OF THE INVENTION

The disadvantages and limitations discussed above are overcome by the present invention. The system of the present invention automatically selects, in response to a customer's request for communication, a customer service center and a customer service representative based on the customer's needs and efficiency considerations. The system of the present invention also enables a monitor to control the initiation of a communication between the selected customer service representative and the customer, enables the monitor to selectively monitor the communication between the customer and the selected customer service representative, and also enables a monitor to control the automatic selection of customer service centers and customer service representatives.

In accordance with the present invention, a customer uses a customer computer system to access a company computer system via a data network and requests contact with a customer service representative. The customer may then select one or more customer preferences from a list of customer preferences provided by the company computer system. The company computer system then automatically selects a customer service center and a customer service representative in accordance with the customer preferences selected by the customer (if any), and a set of selection criteria stored in the one or more company computer system databases.

A monitor, using a monitor computer system, is also connected to the company computer system via the data network. The monitor is notified by the company computer system when a customer service center and a customer service representative are selected by the company computer system, and is also notified of the selection criteria used by the company computer system in making the selection. The monitor may then choose to monitor or to not monitor the communication. The monitor may then choose to accept or to change the customer service center or customer service representative selected by the company computer system. Once a customer service representative has been selected by the company computer system or by the monitor, the company computer system causes a telecommunication control device to connect the customer, the selected customer service representative, and the monitor via a voice network. Thus, the monitor may readily monitor the communication between the customer and the selected customer service representative. If the monitor is not available, or if the monitor chooses not to monitor the communication, the company computer system causes the telecommunication control device to connect the customer and the selected customer service representative, and then records the communication therebetween for future review by the monitor. The monitor may also use the monitor computer system to add, change or delete the various selection criteria stored in the company computer system.

As an alternative embodiment, during the voice communication with the customer or at another time, the selected customer service representative may use a customer service representative computer system to initiate data communication with the customer computer system to provide the customer with additional assistance. If the monitor is monitoring the voice communication, the monitor may use the monitor computer system to also monitor the data communication to and from the customer service representative computer system.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DETAILED DESCRIPTION OF THE PRESENTLY PREFERRED EMBODIMENTS

Before describing the system of the present invention it would be helpful to discuss the various entities, as identified herein, which interact with the system. A "company" is any organization which sells, markets, or distributes products or services to customers. For example, the company may be a wholesale or retail business, an educational institution, a government office or a multi-national corporation.

A "customer service center" (CSC) is a subset of the company which is dedicated to providing information to customers about the company's products or services, and to providing other forms of assistance to customers. Most companies have one or more CSCs organized, for example, by geographical area and/or by an area of expertise. For example, one CSC may be a technical support center for the company's products, while another CSC may provide all customer services in a particular country.

The CSCs are staffed by one or more "customer service representatives" (CSRs) who are trained to answer questions about the company's products or services and to provide other forms of assistance to customers. A "monitor" is an individual who serves as a mentor to the CSRs, and who evaluates the performance of the company's CSRs. In accordance with the present invention, the monitor is also able to control the routing of customer requests for information or assistance to particular CSCs and CSRs. Furthermore, the monitor may be located in a different geographic location from the company's CSCs.

A "customer" is an individual who requires information about the company's products or services or who requires assistance from the company's CSRs in connection with a particular problem.

Figure 1:
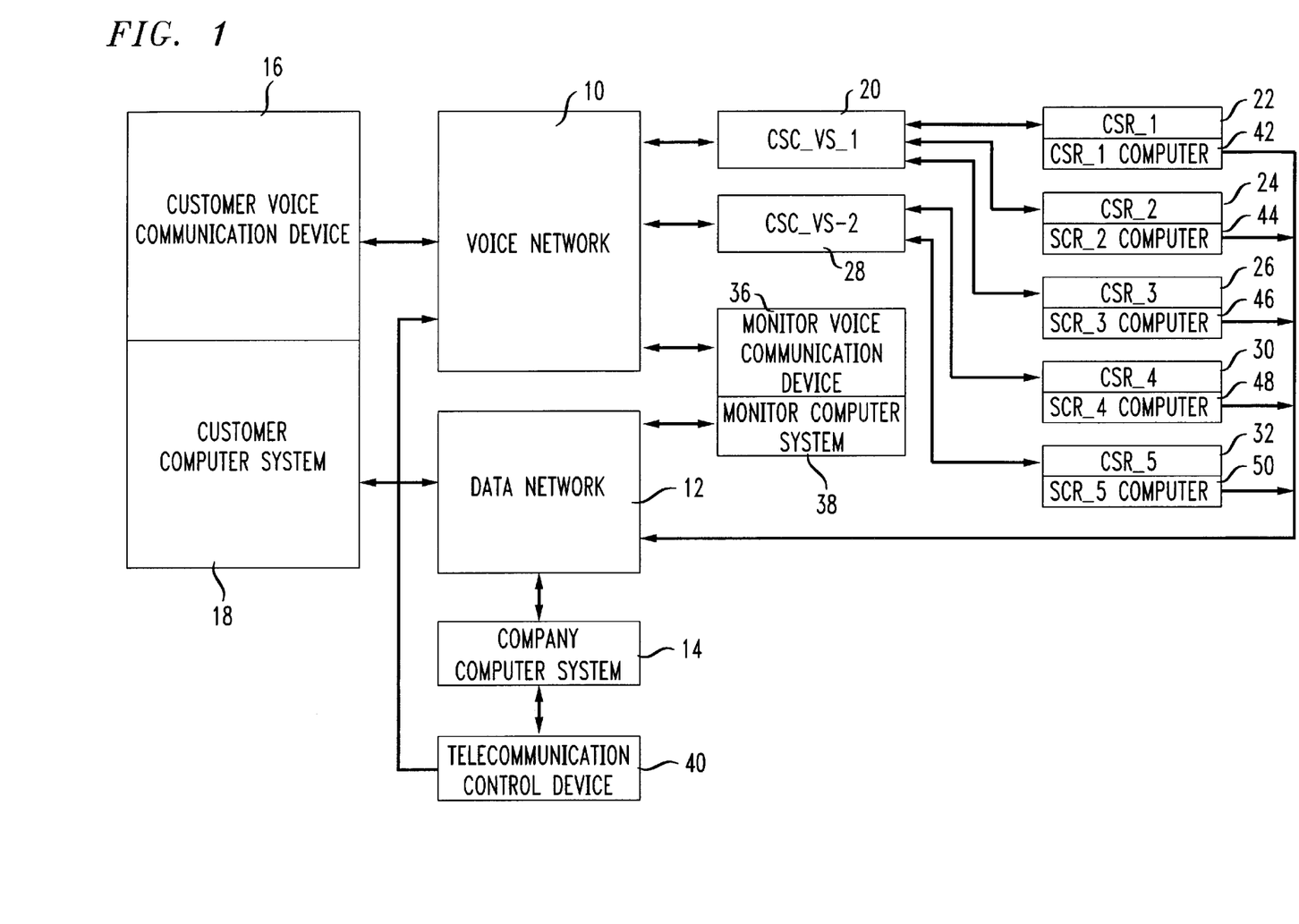
FIG. 1 is a schematic block diagram of a system for controlling and monitoring of customer communication with customer service representatives in accordance with the present invention.

Referring now to the drawings, and initially to FIG. 1 thereof, a voice network 10 is preferably a switched telephone network, but may be any switched telecommunications medium suitable for voice communication, such as a cellular or a satellite-based network. A customer voice communication device 16 is preferably a telephone. The customer voice communication device 16 is connected to the voice network 10 via a telecommunication medium, such as a standard phone line or a wireless (e.g., cellular) link for placing and receiving telephone calls. A monitor voice communication device 36 is preferably a telephone. The monitor voice communication device 36 is also connected to the voice network 10 via a telecommunication medium such a standard phone line or a wireless link for placing and receiving telephone calls.

A first CSC voice system 20 (shown as CSC_VS_1 20 in FIG. 1) is preferably a switched business telephone network with multiple connected telephone lines, such as a PBX system. The $CSC_{13}$ VS_1 20 is associated with a particular CSC. For example, the CSC_VS_1 20 may be physically located in the company's technical support center, or in the company's North American CSC. A selected group of the CSC_VS_1 20 telephone lines (not shown) is preferably allocated to a group of customer service representatives (CSRs). Each of the allocated telephone lines is connected to a voice communication device of a particular CSR. Three such CSR voice communication devices are shown in FIG. 1: CSR_1 22, CSR_2 24 and CSR_3 26. Each of the CSR voice communication devices is preferably a telephone with a unique identifier, such as an extension number. For example, CSR_1 22, may be the telephone of a technical support representative named Bob Jones with extension 3445, while CSR_2 24, may be the telephone of a customer sales associate John Smith with extension 3446. The CSC_VS_1 20 is preferably connected to the voice network 10 for variously routing telephone calls to and from the CSR_1 22, CSR_2 24, and CSR_3 26.

Similarly, a second CSC voice system 28 (shown as CSC_VS_2 28 in FIG. 1) is preferably a switched business telephone network with multiple connected telephone lines, such as a PBX system. The CSC_VS_2 28 is associated with a particular CSC. A selected group of the CSC_VS_2 28 telephone lines is preferably allocated to a group of CSRs. Each of the allocated telephone lines is connected to a voice communication device of a particular CSR. Two such CSR voice communication devices are shown in FIG. 1: CSR_4 30 and CSR_5 32. Each of the CSR voice communication devices is preferably a telephone with a unique identifier, such as an extension number. The CSC_VS_2 28 is preferably connected to the voice network 10 for routing telephone calls to and from the CSR_4 30 and the CSR_5 32.

While three and two CSR voice communication devices (CSR_1 20 through CSR_3 26 and CSR_4 30 through CSR_5 32) are shown in FIG. 1 for each of the voice systems CSC_VS_1 20 and CSC_VS_2 28 respectively, it should be understood that one or more CSR voice communication devices may be connected to each CSC voice system. The maximum number of CSR voice communication devices which may be connected to a CSC voice system is practically limited only by its telephone line capacity. Furthermore, while two CSC voice systems, CSC_1 and CSC_2 are shown in FIG. 1, the number of CSC voice systems which may be connected to the voice network 10 is limited only by the company's resources. Alternatively, where a CSC consists of a single CSR, the CSC voice system may be a CSR voice communication device connected directly to the voice network 10.

A customer computer system 18 is preferably a computer with one or more input devices, such as a keyboard and a mouse (not shown), a display (not shown) and a data communication device, such as a modem (not shown). A data network 12 is preferably the Internet, but may also be any wide area data network. For example, the data network 12 may comprise a group of local area networks (LANs) connected by custom high speed telecommunication lines, such as T3 lines. The customer computer system 18 is preferably connected to the data network 12 via a telecommunication medium, such as a standard phone line, a wireless (e.g., cellular) link, or via a high throughput telecommunication medium such as an Integrated Services Digital Network (ISDN) line or a T1 line for enabling bi-directional data communications with other computer systems connected to the data network 12, and more specifically with a company computer system 14. The customer computer system 18 enables a customer to access the company computer system 14 via the data network 12 in order to request contact with a company's customer service representative.

The company computer system 14 is preferably a network server, with a long-term data storage device, such as one or more hard disk drives (not shown), and one or more data communication devices, such as modems or high speed network gateways (not shown). The company computer system 14 also has a memory (not shown) for storing a control program which controls its operation and for storing an interactive interface program. The company computer system 14 may also be a distributed computer system, such as a LAN, with the capabilities described above. The company computer system 14 is preferably connected to the data network 12 via a high throughput telecommunication medium, such as an ISDN line or T1 line for enabling bi-directional data communication with other computer systems also connected to the data network 12. A connection to the data network 12 via a high throughput telecommunication medium is particularly advantageous for the company computer system 14 because it provides sufficient bandwidth to handle a large number of accesses by other computer systems concurrently connected to the company computer system 14 via the data network 12, such as the customer computer system 18. The company computer system 14 allows a customer, using the customer computer system 18 connected to the company computer system 14 via the data network 12, to view information about a company, its products, and its services stored in the company computer system 14 long term data storage device (not shown). Most importantly, the company computer system 14 enables the connected customer to request contact with a company's customer service representative through the company computer system 14 interactive interface (not shown).

The company computer system 14 also incorporates three databases, stored in the long term data storage device (not shown), for enabling the company computer system 14 to automatically select a particular CSC voice system and a particular CSR for communication with the customer in accordance with one or more sets of selection criteria stored in the databases and in response to the customer's request for contact. Examples of these databases are shown in FIGS. 2–4.

Figure 2:
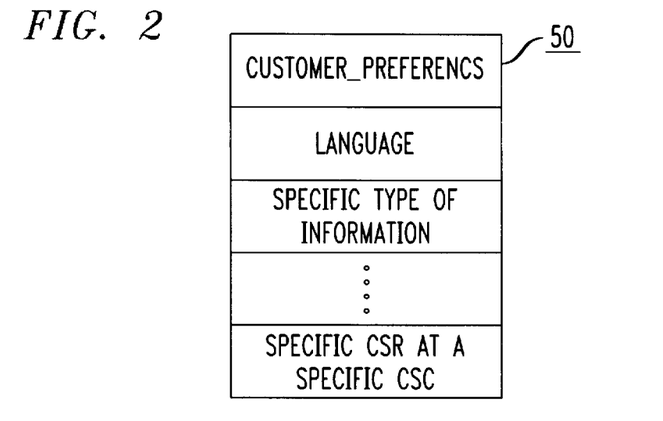
FIG. 2 is a structured data representation of a customer preference database.

Referring now to FIG. 2, a CUSTOMER_PREFERENCES database 50 contains a set of selection criteria pertaining to customer preferences. Examples of customer preferences include, but are not limited to, a particular language, a specific type of information wanted, or even a specific CSR at a specific CSC. The company computer system 14 enables the customer to select one or more customer preferences from the CUSTOMER_PREFERENCES database 50 for use by the company computer system 14 as selection criteria. For example, a customer who wishes to speak to a technical support CSR who has helped him previously may select that CSR as a customer preference.

Figure 3:
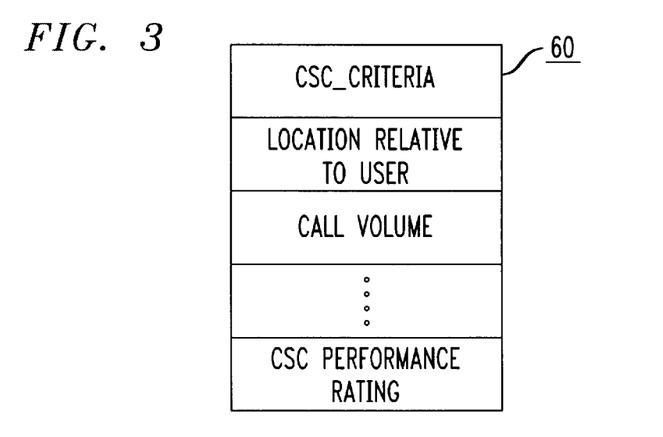
FIG. 3 is a structured data representation of a customer service center selection criteria database.

Referring now to FIG. 3, a CSC_CRITERIA database 60 contains a set of selection criteria pertaining to the automatic selection of a specific CSC. Examples of CSC selection criteria include, but are not limited to, the location of a CSC relative to the location of the requesting customer, the call volume to various CSCs, and the overall performance rating of each CSC.

Figure 4:
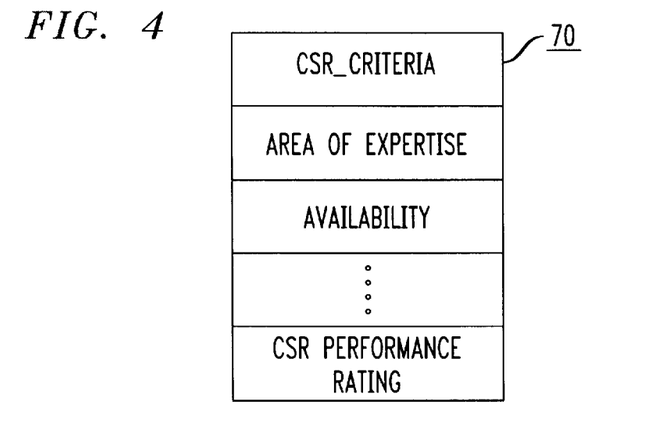
FIG. 4 is a structured data representation of a customer service representative selection criteria database.

Referring now to FIG. 4, a CSR_CRITERIA database 70 contains a set of selection criteria pertaining to the automatic selection of a specific CSR. Examples of CSR selection criteria include, but are not limited to, a CSR's area of expertise, a CSR's availability, and a CSR's performance rating. For example, a particular CSR may be unavailable because she is on vacation.

Returning now to FIG. 1, a monitor computer system 38 is preferably a computer with one or more input devices, such as a keyboard and a mouse (not shown), a display (not shown) and a data communication device, such as a modem (not shown). The monitor computer system 38 is preferably connected to the data network 12 via a telecommunication medium, such as a standard phone line, a wireless link, or via a high throughput telecommunications medium such as an ISDN line or T1 line for enabling bi-directional data communications with other computer systems connected to the data network 12, and more specifically with the company computer system 14. Preferably, the company computer system 14 contacts the monitor computer system 38 via the data network 12 when it selects a particular CSR from a particular CSC for contact with a customer. The monitor may use the monitor computer system 38 to change the automatic selection of the CSC and the CSR made by the company computer system 14. While connected to the company computer system 14 via the data network 12, the monitor may also use the monitor computer system 38 to change the intelligence behind the automatic selection of the CSCs and CSRs made by the company computer system 14 by adding, changing, or deleting the selection criteria contained in the CUSTOMER_PREFERENCES, the CSC_CRITERIA, and the CSR_CRITERIA databases.

A telecommunication control device 40 is preferably a system capable of switching and routing telephone calls between multiple voice communication devices, such as the customer voice communication device 16, and voice systems, such as CSC_VS_1 20, via the voice network 10. An example of a telecommunication switching and routing device is an AT&T Conversant Box. The telecommunication control device 40 is connected to the voice network 10 via a telecommunication line. The telecommunication system 40 is also connected to and is controlled by the company computer system 14. Thus, the company computer system 14 can cause the telecommunication control device 40 to place telephone calls to various voice communication devices and voice systems and to bridge calls together to facilitate, for example, a three-way telephone communication between the customer and a CSR, with the monitor listening in.

In an alternative embodiment of the present invention, each CSR may have a CSR computer system in addition to having an individual CSR voice system. Five such CSR computer systems are shown in FIG. 1: CSR_1 computer 42, CSR_2 computer 44, CSR_3 computer 46, CSR_4 computer 48, and CSR_5 computer 50. Each CSR computer system is preferably a computer with one or more input devices, such as a keyboard and a mouse (not shown), a display (not shown) and a data communication device, such as a modem (not shown). Each CSR computer system is preferably connected to the data network 12 via a telecommunication medium, such as a standard phone line, a wireless (e.g., cellular) link, or via a high throughput telecommunication medium such as an ISDN line or T1 line for enabling bi-directional data communications with other computer systems connected to the data network 12, and more specifically with the customer computer system 18. For example, the CSR_1 computer 42 enables a CSR to send data to and receive data from the customer computer system 18 via the data network 12.

Data communication between the CSR and the customer may occur during the voice communication therebetween or, optionally it may occur at another time. For example, after the customer speaks to a CSR, the customer may request that the CSR transmit a copy of an updated software program to the customer computer system 18. The monitor may use the monitor computer system 38 to monitor data communication to and from a CSR computer system (such as the CSR_1 computer 42).

In a preferred embodiment of the system of the present invention, the data network 12 is the Internet. Thus, before describing the operation of the system of the present invention (described below in connection with FIGS. 5–6), it would be helpful to briefly discuss the basic functionality of the Internet as it relates to the system of the present invention. The Internet is well known in the art as a worldwide data network of various computer systems and other data networks of varying size. Connection to the Internet may be accomplished via standard phone lines or via dedicated high-throughput communications lines such as ISDN and T1.

The functionality of the Internet as a data communication medium is well known and encompasses a broad range of applications. One such application is the World Wide Web (WWW). The WWW is a subset of the Internet which allows computers connected to the Internet to access interactive programs called Web Sites located on other Internet-connected computers by entering a unique "address" associated with a particular Web Site. Because of their interactive features, Web Sites are ideal for both distributing and gathering information. Most importantly, a particular computer's Web Site may be linked to and may control other programs stored on the same or on another computer connected to the Internet. For example, a Web Site describing a company's products and services may be stored in the company computer 14 memory (not shown) and accessed via the data network 12 (in this case, the Internet) by a customer using the customer computer system 18. The customer may view information about the company provided by the Web Site, but may also use the Web Site's interactive features to place a request for more information from the company or for technical support for the company's product. The Web Site may then cause another program stored in the company computer system 14 memory (not shown) to automatically select an appropriate CSR to contact the customer in response to the customer's request. This, and other features of the Internet make it preferable as the data network 12 in accordance with the system of the present invention.

The operation of the system of the present invention is generally controlled by a control program stored in the company computer system 14 memory, and executed by the company computer system 14. This control program usually consists of multiple integrated program modules, with each module bearing responsibility for controlling one or more functions of the company computer system 14. For example, one program module may control the automatic selection of a particular CSR for contact with a customer, while another program module may control the recording of communication between a customer and a CSR when a monitor is not available. In effect, each program module is a control program dedicated to a specific function or set of functions of the company computer system 14. As described above, in connection with the discussion of the Internet, the control program may be linked to an interactive Web Site also stored in the company computer system 14 memory. The control program of the present invention is described below in connection with FIGS. 5 and 6.

Figure 5:
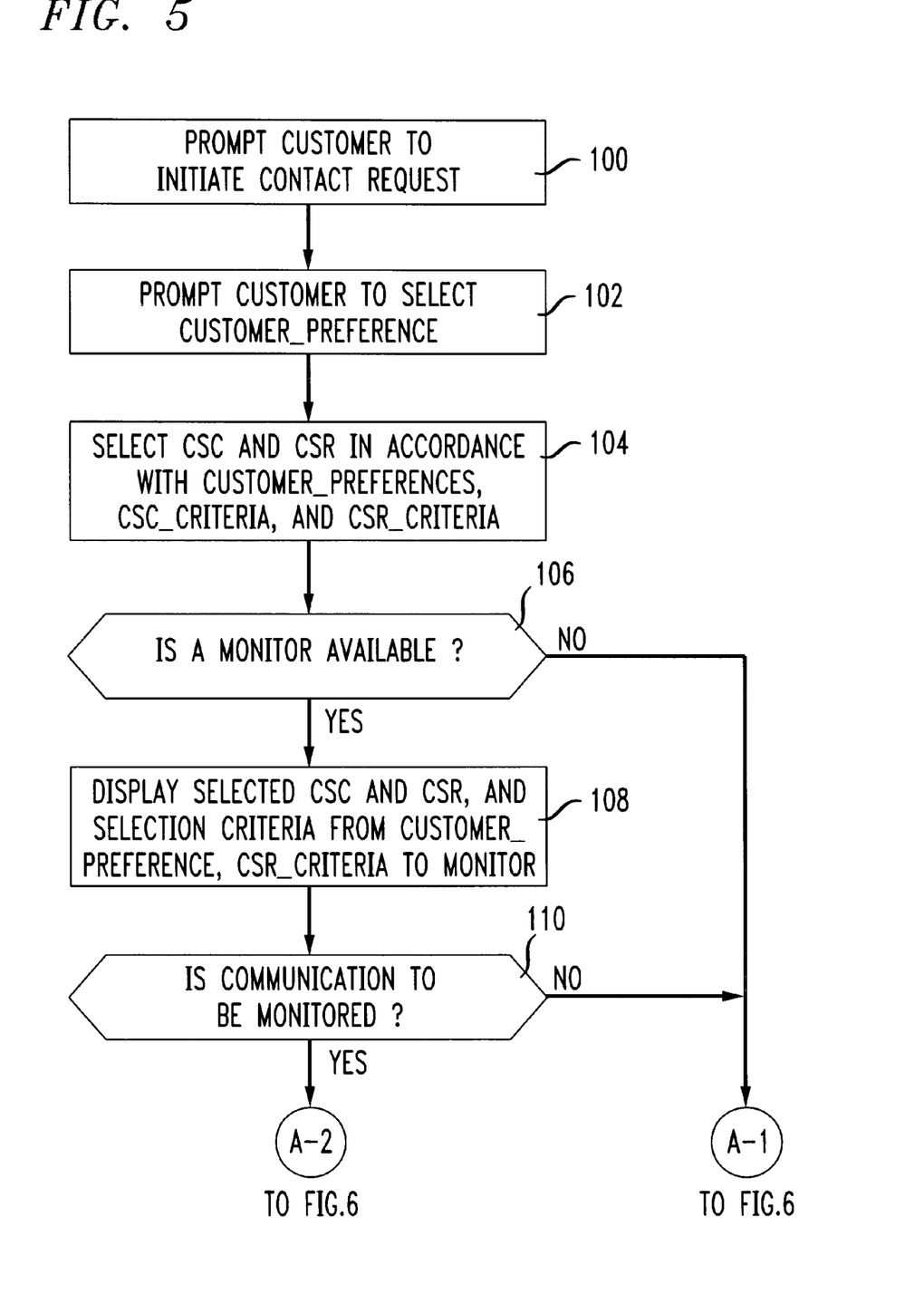
FIGS. 5 and 6 are logic flow diagrams representative of the functional operation of the system of FIG. 1 in accordance with the present invention.
Figure 6:
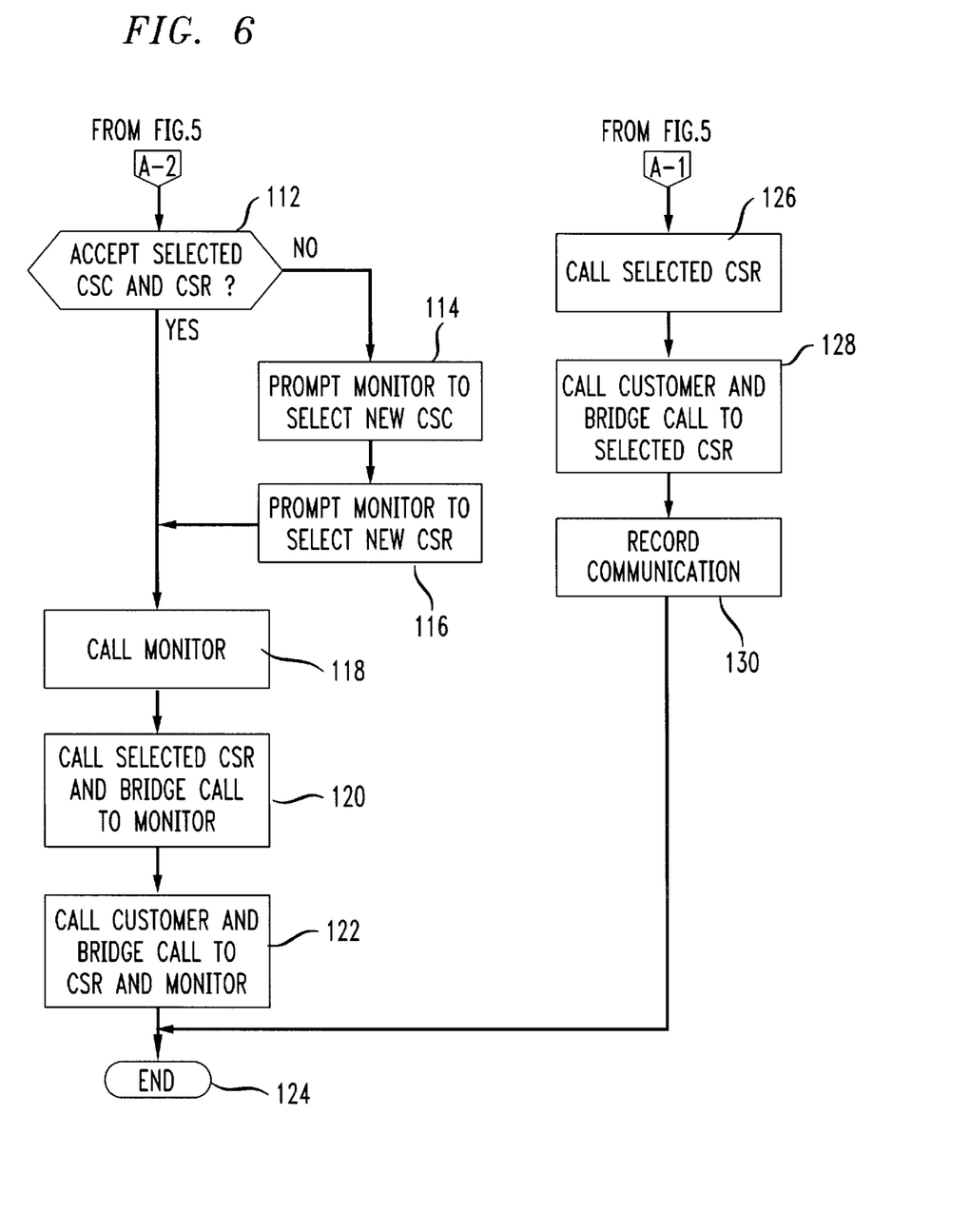

Referring now to FIGS. 5–6, a logic flow diagram representing the control program for the company computer system 14 of FIG. 1 in accordance with the present invention is described. The execution of this control program begins when a customer using the customer computer system 18 connects to the company computer system 14 via the data network 12 to place a request for contact by a CSR.

The control program begins at a step 100 when the company computer system 14 prompts the customer to initiate a request for contact. For example, this may be accomplished by displaying a prompt on the company computer system 14 interactive interface, such as a Web Site (not shown). The prompt may be a graphical button, displayed by the Web Site, on which the customer can click using a mouse. When the customer initiates the request for contact by responding to the prompt, the company computer system 14 proceeds to a step 102.

At step 102, the company computer system 14 prompts the customer to select one or more customer preferences from the CUSTOMER_PREFERENCES database 50. For example, the customer may select the "language" preference to request that a CSR who contacts her speaks a particular language (such as Spanish). Optionally, the customer may choose not to select any customer preferences.

At a step 104, the company computer system 14 automatically selects a CSC and a CSR from a list of CSCs and corresponding CSRs stored in the company computer system 14 long term data storage device. The selection is made in accordance with the selection criteria of the customer selected preferences from the CUSTOMER_PREFERENCES database 50, and the CS_CRITERIA and CSR_CRITERIA databases 60, 70, also stored in the company computer system 14 long term data storage device. Of course, if the customer did not select any customer preferences from the CUSTOMER_PREFERENCES database at step 102, only the CSC_CRITERIA and CSR_CRITERIA databases are used in the automatic selection. The following example illustrates the functionality of the automatic selection at step 104, assuming the selection criteria in the databases are as illustrated in FIGS. 2–4. A Spanish-speaking customer from New York has requested contact with a company's CSR regarding technical information about a television sold by the company. The customer selects the "specific type of information" customer preference from the CUSTOMER_PREFERENCES database 50. The customer also selects the "language" customer preference from the CUSTOMER_PREFERENCES database as Spanish. At step 114, the company computer system 14 automatically selects a Spanish-speaking CSR with an expertise in televisions located at the closest CSC to the customer with the lowest call volume.

It should be understood that since each CSC is associated with a particular CSC voice system (such as the CSC_

VS_1 20), selection of a particular CSC by the company computer system 14 is functionally equivalent to the selection of that CSC's voice system. Similarly, since each CSR is associated with a particular voice communication device (such as the CSR_1 22), the selection of a particular CSR is functionally equivalent to the selection of that CSR's voice communication device. For example, if a company's North American Technical Support CSC is associated with the CSC_VS_1 20, and a technical support CSR number 12 located there is associated with the CSR_1 voice communication device 22, selection of the North American Technical Support CSC and the technical support CSR number 12 at step 104 is equivalent to selection of the CSC_VS 1 20 and the CSR_1 22.

At a test 106, company computer system 14 determines whether a monitor is available to monitor the communication between the customer and the CSR selected at step 104. For example, a monitor may not be available if he is already monitoring another such communication. If the company computer system 14 determines that a monitor is not available, then the company computer system 14 proceeds to a step 126. If the company computer system 14 determines that a monitor is available, at a step 108 the company computer system 14 displays the selected CSC and CSR, as well as the selection criteria from the CUSTOMER_PREFERENCES, CSC_CRITERIA and CSR_CRITERIA databases 50, 60, 70 used by the company computer system 14 for the automatic selection at step 104.

At a test 110, the company computer system 14 determines whether the communication between the requesting customer and the selected CSR is to be monitored. For example, the monitor may decide to monitor the communication between the customer and the selected CSR after viewing, at step 108, the automatic selection made by the company computer system 14 at step 104. If the communication is not to be monitored, then the company computer system 14 proceeds to step 126. If the communication is to be monitored, the company computer system 14 proceeds to a test 112.

At test 112, the company computer system 14 determines if both the CSC and CSR selected at step 104 are acceptable to the monitor. If both are acceptable, the company computer system 14 then proceeds to a step 118. If at least one of the selected CSC and CSR is not acceptable, on the other hand, the company computer system 14 proceeds to a step 114 where it prompts the monitor to select a new CSC. The company computer system 14 then proceeds to a step 116 where it prompts the monitor to select a new CSR. For example, the monitor may want the communication to come from a particular CSC or even a particular CSR, so that performance of that CSR may be monitored. The monitor may also elect to override the selection of CSC and CSR made by the company computer system 14 without permanently changing the selection criteria.

At step 118, the company computer system 14 causes the telecommunication control device 40 to place a telephone call to the monitor through monitor voice communication device 36 via the voice network 10. At a step 120, the company computer system 14 causes the telecommunication control device 40 to place a telephone call to the selected CSR through the CSR's voice communication device (such as the CSR_3 26) and through the selected CSC voice system (such as the CSC_VS_1 20) via the voice network 10, and to bridge the call to the monitor without the CSR's knowledge. At a step 122, the company computer system 14 causes the telecommunication control device 40 to place a telephone call to the customer through the customer voice communication device 16, and to bridge the call to the CSR and the monitor. Thus, the monitor may listen in on the communication between the customer and the CSR. Optionally, to serve as a mentor, the monitor may use the monitor voice communication device 36 to interrupt the communication between the customer and the CSR to provide guidance or to address a problem that arises during the communication. The company computer system 14 then ends the operation of the control program at a step 124.

At step 126, the company computer system 14 causes the telecommunication control device 40 to place a telephone call to the selected CSR through the CSR's voice communication device (such as the CSR_3 26) and through the selected CSC voice system (such as the CSC_VS_1 20) via the voice network 10. At a step 128, the company computer system 14 causes the telecommunication control device 40 to place a telephone call to the customer through the customer voice communication device 16 via the voice network 10 and to bridge the call to the selected CSR. At a step 130, the company computer system 14 records the communication between the selected CSR and the customer for future review by the monitor. The company computer system 14 then ends the operation of the control program at step 124.

In the alternative embodiment discussed above in connection with FIG. 1, the selected CSR may use a CSR computer system (such as the CSR_1 computer 42) to initiate data communication with the customer computer system 18 via the data network 12. For example, the selected CSR may use the CSR_1 computer 42 to receive a copy of the customer's problematic configuration files, and then send a corrected version of those files back to the customer, all via the data network 12. The monitor may use the monitor computer system 38 to readily monitor the data communication to and from the selected CSR's computer system via the data network 12.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

We claim:

1. A system for selecting a customer service voice system from a plurality of customer service voice systems via a data network in response to a request by a customer, comprising:

first selection means for automatically selecting a customer service voice system from the plurality of customer service voice systems; wherein said first selection means further comprises a customer service voice system selection database having a memory for storing a set of customer service voice system selection criteria, wherein the first selection means automatically selects a customer service voice system from the plurality of customer service voice systems in accordance with the set of customer service voice system selection criteria, wherein each customer service voice system of the plurality of customer service voice systems is associated with a unique customer service center having a location, a call volume and an overall performance rating, and wherein said customer service voice system selection criteria comprises at least one of the location of each customer service center relative to the location of the requesting customer, the call volume to each customer service center, and the overall performance rating of each customer service center; and first override means connected to the first selection means via the data network for changing the customer service voice system selected by the first selection means to another of the plurality of customer service voice systems.

2. The system of claim 1, further comprising a second data network, and wherein said first override means is connected to the first selection means via the second data network.

3. The system of claim 1, further comprising first control means, connected to the first selection means via the data network, for changing the set of customer service voice system selection criteria.

4. The system of claim 1, wherein each of the plurality of the customer service voice systems comprises at least one customer service representative voice communication means, each of said at least one customer service representative voice communication means being associated with a unique customer service representative having a status representative of availability, an area of expertise, and a performance rating.

5. The system of claim 4, further comprising:

second selection means, connected to the first selection means, for automatically selecting a customer service representative voice communication means from said at least one customer service representative voice communication means; and second override means, connected to the first override means, for changing the customer service representative voice communication means selected by the second selection means to another of said at least one customer service representative voice communication means.

6. The system of claim 5, wherein said third selection means further comprises a customer service representative selection database having a memory for storing a set of customer service representative selection criteria, and wherein the second selection means automatically selects a customer service representative voice communication means from said at least one customer service representative voice communication means in accordance with the set of customer service representative selection criteria.

7. The system of claim 6, further comprising second control means, connected to the first selection means via the data network, for manually changing the set of customer service representative selection criteria.

8. The system of claim 6, wherein said customer service representative selection criteria is at least one of a customer service representative's availability, a customer service representative's area of expertise, and a customer service representative's performance rating.

9. The system of claim 6, further comprising a customer preference database connected to the first and the second selection means, said customer preference database having a memory for storing a set of customer preferences pertaining to the selection of a customer service representative voice communication means from said at least one customer service representative voice communication means.

10. The system of claim 9, further comprising:

display means, connected to the customer preference database via the data network, for displaying to a customer the set of customer preferences;

third selection means, connected to the display means, for enabling a customer to select at least one customer preference from the set of customer preferences; and integration means, connected to the second selection means, for integrating the at least one customer preference into said set of customer service representative selection criteria.

11. The system of claim 9, wherein the set of customer preferences is at least one of a particular language, a particular type of information, and a particular customer service representative.

12. A system for monitoring voice communication between a customer and a customer service voice system by a monitor via a voice network and a data network, comprising:

customer voice communication means for enabling the customer to communicate with the customer service voice system via the voice network;

monitor voice communication means for enabling the monitor to communicate, via the voice network, with the customer voice communication means and with the customer service voice system;

third control means for determining whether the customer service voice system is to be monitored; and first connection means, connected to the third control means via the data network, for connecting the customer voice communication means and the customer service voice system via the voice network to establish bi-directional voice communication therebetween when the third control means determines that the customer service voice system is not to be monitored, and for first connecting the customer service voice system to the monitor voice communication means via the voice network, and subsequently connecting the customer voice communications means to the customer service voice system and the monitor communication means via the voice network to establish a three-way voice communication therebetween when the third control means determines that the customer service voice system is to be monitored.

13. The system of claim 12, wherein the customer service voice system comprises a customer service representative voice communication means for enabling voice communication with the customer voice communication means via the voice network, said customer service representative voice communication means being associated with a unique customer service representative.

14. The system of claim 12, further comprising recording means, connected to the third control means via the data network and to the first connection means via the voice network, for selectively recording the voice communication between the customer voice communication means and the customer service voice system.

15. The system of claim 14, wherein said recording means records the voice communication between the customer voice communication means and the customer service voice system when the third control means determines that the customer service voice system is not to be monitored.

16. The system of claim 12, wherein the third control means comprises means for determining whether a monitor is available to monitor said customer service voice system, such that when said means for determining determines that the monitor is not available, said customer service voice system is not to be monitored.

17. The system of claim 12, wherein the third control means comprises means for manually selecting whether said customer service voice system is to be monitored.

18. A system for monitoring a communication signal representative of communication between a customer and a customer service communication means, by a monitor via at least one of a data network and a voice network, comprising:

customer communication means for enabling the communication by the customer with the customer service communication means via at least one of the data network and the voice network;

monitor communication means for enabling communication by the monitor with the customer service communication means via at least one of the data network and the voice network;

fourth control means for determining whether the customer service communication means is to be monitored; and     second connection means, connected to the forth control means, for connecting the customer communication means and the customer service communication means via at least one of the data network and the voice network to establish bi-directional communication therebetween when the fourth control means determines that the customer service communication means is not to be monitored, and for first connecting the customer service communication means to the monitor communication means via at least one of the data network and the voice network to enable the monitor to monitor communication to and from the customer service communication system, and subsequently connecting the customer communications means to the customer service communication means via at least one of the data network and the voice network to establish bi-directional communication therebetween when the fourth control means determines that the customer service communications means is to be monitored.

19. The system of claim 18, wherein said communication signal is representative of data communication.

20. The system of claim 18, wherein said communication signal is representative of both data and voice communication.

21. A system for selective connection of a customer voice communication means to a customer service voice system from a plurality of customer service systems via a voice network and a data network, comprising:

requesting means for generating request data representative of a request for connection of the customer voice communication means to a customer service voice system of the plurality of customer service voice systems;

first selection means, connected to the requesting means via the data network, for automatically selecting a customer service voice system from the plurality of customer service voice systems when the request data is generated by said requesting means, wherein the first selection means further comprises a customer service voice system selection database having a memory for storing a set of customer service voice system selection criteria and wherein the first selection means automatically selects a customer service voice system from the plurality of customer service voice systems in accordance with the set of customer service voice system selection criteria, wherein each customer service voice system of the plurality of customer service voice systems is associated with a unique customer service center having a location, a call volume and an overall performance rating, and wherein said customer service voice system selection criteria comprises at least one of the location of each customer service center relative to the location of the requesting customer, the call volume to each customer service center, and the overall performance rating of each customer service center;

first override means, connected to the first selection means via the data network, for changing the customer service voice system selected by the first selection means to another of the plurality of customer service voice systems; and     first connection means, connected to the first override means via the data network, for connecting the customer voice communication means and the selected customer service voice system via the voice network to establish bi-directional voice communication therebetween.

22. The system of claim 21, wherein each customer service voice system of the plurality of customer service voice systems comprises a customer service representative voice communication means associated with a unique customer service representative.

23. A system for selectively connecting a customer voice communication means to a customer service voice system from a plurality of customer service voice systems and for monitoring said selective connection via a voice network and a data network, comprising:

monitor voice communication means for enabling the monitor to communicate, via the voice network, with the customer voice communication means and with the customer service voice system;

requesting means for generating request data representative of a request for connection of the customer voice communication means to at least one customer service voice system of the plurality of customer service voice systems;

first selection means, connected to the requesting means via the data network, for automatically selecting a customer service voice system from the plurality of customer service voice systems when the request data is generated by said requesting means;

first override means, connected to the first selection means via the data network, for changing the customer service voice system selected by the first selection means to another of the plurality of customer service voice systems;

control means, connected to the first override means and to the first selection means via a data network, for determining whether the selected customer service voice system is to be monitored; and     connection means, connected to the control means via the data network, for connecting the customer voice communication means and the customer service voice system via the voice network to establish bi-directional voice communication therebetween when the third control means determines that the customer service voice system is not to be monitored, and for first connecting the customer service voice system to the monitor voice communication means via the voice network, and subsequently connecting the customer voice communications means to the customer service voice system and the monitor communication means via the voice network to establish three-way voice communication therebetween when the control means determines that the customer service voice system is to be monitored.

24. A method for selecting a customer service voice system from a plurality of customer service voice systems via a data network in response to a request by a customer, comprising the steps of:

(a) automatically selecting a customer service voice system from the plurality of customer service voice systems, wherein each customer service voice system of the plurality of customer service voice systems is associated with a unique customer service center having a location, a call volume and an overall performance rating;

(b) selectively changing the customer service voice system selected at the automatic selection step to another of the plurality of customer service voice systems; and (c) storing, in a customer service voice system selection database, a set of customer service voice system selection criteria, such that a customer service voice system from the plurality of customer service voice systems is automatically selected at said step (a) in accordance with the set of customer voice system selection criteria, wherein said customer service voice system selection criteria is at least one of the location of a customer service center relative to the location of the requesting customer, the call volume to each customer service center, and the overall performance rating of each customer service center.

25. The method of claim 24, further comprising the step of:

(d) selectively changing the set of customer service voice system selection criteria.

26. The method of claim 24, wherein each of the plurality of customer service voice systems, including said selected customer service voice system, further comprises at least one customer service representative voice communication device associated with a unique customer service representative having a status representative of availability, an area of expertise, and a performance rating.

27. The method of claim 26, further comprising the steps of:

(e) automatically selecting a customer service representative voice communication device from said at least one customer service representative voice communication device; and (f) selectively changing the customer service representative voice communication device selected at said step (e) to another of said at least one customer service representative voice communication device.

28. The method of claim 27, wherein said step (e) further comprises the step of:

(g) storing, in a customer service representative selection database, a set of customer service representative selection criteria such that a customer service representative voice communication device from said at least one customer service representative voice communication device is selected, at said step (e), in accordance with the set of customer service representative selection criteria.

29. The method of claim 28, further comprising the step of (h) selectively changing the set of customer service representative selection criteria.

30. The method of claim 28, wherein said customer service representative selection criteria comprises at least one of a customer service representative's availability, a customer service representative's area of expertise, and a customer service representative's performance rating.

31. The method of claim 28, further comprising the step of:

(i) storing, in a customer preference database, a set of customer preferences pertaining to the selection of a customer service representative voice communication device from said at least one customer service representative voice communication devices.

32. The method of claim 31, further comprising the steps of:

(j) displaying the set of customer preferences to a customer;

(k) detecting at least one customer preference selected from the set of customer preferences; and (l) integrating the at least one customer-selected preference into said set of customer service representative selection criteria.

33. The method of claim 31, wherein the set of customer preferences comprises at least one of a particular language, a particular type of information, and a particular customer service representative.

34. A method of monitoring, via a voice network and a data network, a call from a customer voice communication device to a customer service voice system by a monitor using a monitor voice communication device, comprising the steps of:

(a) determining whether the customer service voice system is to be monitored;

(b) connecting the customer voice communication device and the customer service voice system via the voice network to establish bi-directional voice communication therebetween when it is determined, at said step (a), that the customer service voice system is not to be monitored; and (c) first connecting the customer voice communication device to the monitor voice communication device via the voice network, and subsequently connecting the customer and the monitor voice communication devices to the customer service voice system via the voice network when it is determined, at said step (a), that the customer service voice system is to be monitored.

35. The method of claim 24, wherein the customer service voice system comprises a customer service representative voice communication device, said customer service representative voice communication device being associated with a unique customer service representative.

36. The method of claim 34, further comprising the step of:

(d) recording the voice communication between the customer voice communication device and the customer service voice system when it is determined, at the step (a), that the customer service system is not to be monitored.

37. The method of claim 34, wherein the step (a) further comprises the step (q) of determining whether a monitor is available to monitor said customer service voice system, such that when it is determined, at the step (e), that the monitor is not available, said customer service voice system is not to be monitored.

38. The method of claim 34, wherein the step (a) further comprises the step (f) of manually selecting whether said customer service voice system is to be monitored.

39. A method for monitoring a communication signal representative of communication between a customer communication device and a customer service communication device, by a monitor using a monitor communication device, via at least one of a data network and a voice network, comprising the steps of:

(a) determining whether the customer service communication device is to be monitored;

(b) connecting the customer communication device and the customer service communication device via at least one of the data network and the voice network to establish bi-directional communication therebetween when it is determined, at said step (a), that the customer service communication device is not to be monitored; and (c) first connecting the customer service communication device to the monitor communication device via at least one of the data network and the voice network to enable the monitor to monitor communication to and from the customer service communication device, and subsequently connecting the customer service communication device to the customer communication device via at least one of the data network and the voice networkto establish bi-directional communication therebetween when it is determined, at said step (a), that the customer service communication device is to be monitored.

40. The method of claim 39, wherein said communication signal is representative of data communication.

41. The method of claim 39, wherein said communication signal is representative of both voice and data communication.

42. A method of selective connection of a customer voice communication device to a customer service voice system from a plurality of customer service systems, via a voice network and a data network comprising the steps of:

(a) generating request data representative of a request for connection of the customer voice communication device to a customer service voice system of the plurality of customer service voice systems;

(b) automatically selecting a customer service voice system from the plurality of customer service voice systems when the request data is generated at said step (a);

(c) storing in a customer service voice system selection database, a set of customer service voice system selection criteria, such that a customer service voice system from the plurality of customer service voice systems is automatically selected at said step (b) in accordance with the set of customer service voice system selection criteria, wherein each customer service voice system of the plurality of customer service voice systems is associated with a unique customer service center having a location, a call volume and an overall performance rating, and wherein said customer service voice system selection criteria is at least one of the location of a customer service center relative to the location of the requesting customer, the call volume to each customer service center, and the overall performance rating of each customer service center;

(d) selectively overriding the selected customer service voice system by changing the customer service voice system selected at said step (b) to another of the plurality of customer service voice systems; and (e) connecting the customer voice communication device and the selected customer service voice system via the voice network to establish bi-directional voice communication therebetween.

43. The method of claim 42, wherein each customer service voice system of the plurality of customer service voice systems comprises a customer service representative voice communication device associated with a unique customer service representative.

44. A method of selectively connecting a customer voice communication device to a customer service voice system from a plurality of customer service voice systems, and of monitoring said selective connection by a monitor using a monitor voice communication device, via a voice network and a data network, comprising the steps of:

(a) generating request data representative of a request for connection of the customer voice communication device to at least one customer service voice system of the plurality of customer service voice systems;

(b) automatically selecting a customer service voice system from the plurality of customer service voice systems when the request data is generated;

(c) selectively overridng the selected customer service voice system by changing the customer service voice system selected at said step (b) to another of the plurality of customer service voice systems;

(d) determining whether the selected customer service voice system is to be monitored; and (e) connecting the customer voice communication device and the customer service voice system via the voice network to establish bi-directional voice communication therebetween when it is determined at said step (d) that the customer service voice system is not to be monitored, and for first connecting the customer service voice system to the monitor voice communication device via the voice network, and subsequently connecting the customer voice communications device to the customer service voice system and the monitor communication device via the voice network to establish three-way voice communication therebetween when it is determined at said step (d) that the customer service voice system is to be monitored.

* * * * *